United States Patent Office 3,511,707
Patented May 12, 1970

3,511,707
METHOD OF CLEANING A STONE SURFACE AND COMPOSITION THEREFOR
Paul E. La Flamme, St. Catherines, Ontario, Canada, assignor to North American Detergent Corporation, Washington, D.C., a corporation of Nevada
No Drawing. Filed May 8, 1967, Ser. No. 636,654
Int. Cl. B08b 3/02; C11d 7/48
U.S. Cl. 134—27
11 Claims

ABSTRACT OF THE DISCLOSURE

A stone-cleaning composition comprising 15 to 26% by weight of an alkali metal hydroxide, 3 to 8% by weight of a lignosulfonate, 0.1 to 3% by weight of a non-ionic wetting agent and the balance by weight of water. The composition is applied to the surface to be cleaned, left to stand in contact with the surface for an extended period of time and washed off with a spray of water delivered at a nozzle pressure of at least 300 pounds per square inch, a neutralizer composition is applied to the clean surface, left to stand in contact with the surface for a short period of time and then washed off with a spray of water delivered at a nozzle pressure of at least 300 pounds per square inch.

---

This invention relates to a cleaning composition and to a method of cleaning certain kinds of stone.

An object of the invention is to provide a cleaning composition having superior stone cleaning properties.

The present invention provides a cleaning composition comprising 15 to 26% by weight of an alkali metal hydroxide, 3 to 8% by weight of a lignosulfonate, 0.1 to 3% by weight of a non-ionic wetting agent and the balance by weight of water.

Compositions containing varying amounts of sodium hydroxide, a lignosulfonate and a non-ionic wetting agent are known but these compositions are used to solubilize metal salts contained in water so as to render the water soft. Further, these compositions have been used to reduce corrosion on zinc or tin. I am not aware, however, of any suggestion in the prior art to use this type of composition to clean stone surfaces, especially soft stone.

I have discovered that by the use of certain specific proportions of an alkali metal hydroxide, a lignosulfonate and a non-ionic wetting agent, I obtain a composition which has a use not previously contemplated by the art.

The first constituent of my composition is an alkali metal hydroxide. The minimum quantity of an alkali metal hydroxide which I contemplate is 15% by weight of the total composition. If a composition containing less than this amount is used I find that I do not obtain satisfactory cleaning of stone surfaces. I use up to 26% by weight of alkali metal hydroxide while I could employ more, I find it generally unsatisfactory to do so, since such strong alkali will attack the stonework. Further, a strong alkali solution would represent a potential danger to the operator of the cleaning process of the alkali metal hydroxides. I prefer to employ sodium hydroxide.

The second constituent of my composition is a lignosulfonate, preferably calcium lignosulfonate. I use from 3 to 8% by weight of the total composition of the lignosulfonate.

The third constituent of my composition is a non-ionic wetting agent. Any non-ionic wetting agent may be employed. I prefer to use an ethylene oxide-higher alkylated phenol condensation product, particularly an ethylene oxide-nonylphenol condensation product, as the wetting agent. One particular class of such materials is represented by the formula:

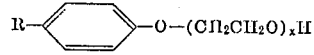

where R is an alkyl radical containing from 7 to 9 carbon atoms and $x$ is a positive whole number of from 5 to 9. I prefer to use a compound of the formula:

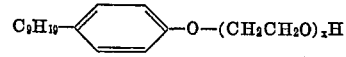

wherein $x$ is a positive whole number from 5 to 9. A compound where $x$ is 5 produces excellent results. Such materials are known under the trade name Chromac 816.

In my composition I use from 0.1 to 3% by weight of non-ionic wetting agent. If I use more than 3% by weight of wetting agent in my composition, too much detergent action occurs on the application of my composition to the stonework thereby impairing the cleaning action of the alkali.

My preferred composition contains 21.5% by weight of sodium hydroxide, 5.0% by weight of calcium lignosulfonate, 0.5% by weight of a non-ionic wetting agent and the balance by weight of water.

I prefer to include a trace of pine oil or like perfume to give the stonework a sweet smell after cleaning.

I have found that my composition is useful for cleaning stonework, especially soft stone. Buildings constructed of stone, when exposed to the atmosphere over a period of time, become coated with a variety of contaminants, mainly carbon-containing, due to the build up of dry dust deposited from the atmosphere and due to rainfall washing particles out of the atmosphere and depositing them on the stone. The atmosphere of most cities is contaminated by a variety of materials caused by industrial effluents and automobile exhausts. With soft stone, the rainwater drives the dirt into pores in the stonework making the removal of the contaminants by plain water extremely difficult. Buildings, therefore, have to be cleaned from time to time. My composition very readily and very quickly cleans soiled stonework surfaces.

In using my composition, I first spray it onto the surface to be cleaned under a low pressure, preferably from 20 to 30 pounds per square inch, or I apply my composition to the surface with a hand brush. As will be obvious to those skilled in the art, other methods of applying the composition to the surface may be employed. The composition is next left in contact with the surface for a sufficient time for the composition to permeate the surface, preferably about 20 to 30 minutes. The surface is next washed with water delivered at a nozzle pressure of at least 300 pounds per square inch. Due to the penetration of the surface by the alkali washing with water is not sufficient to remove all the alkali. If left in contact with the stone, the alkali would, over a period of time, cause damage to the facing by reaction with and beneath the surface. I thereby neutralize the alkali by applying a neutralizer to the clean surface by spraying at a nozzle pressure of 20 to 30 pounds per square inch or by brushing the neutralizer onto the clean surface. Other methods of applying the neutralizer to the surface could be employed. I then let the neutralizer stand in contact with the surface for a short period of time, usually less than 1 minute and preferably 10 to 20 seconds. I finally rinse the neutralizer from the surface at a minimum nozzle pressure of 300 pounds per square inch. Any acid-containing composition could be used as the neutralizer, but I prefer to use one containing 34.8% by weight 100% concentrated hydrochloric acid, 3.0% by weight of a non-ionic wetting agent, preferably an ethylene oxide-nonylphenol condensation product, and the balance by weight of water.

I also incorporate a trace of pine oil or similar perfume into this composition so as to provide a sweet smell to the finished surface.

In order to prolong the period before which the building has to be cleaned again, I find it useful to treat the stonework with a silicone fluid immediately after cleaning. The silicone fluid forms a hydrophobic barrier on the stone so that any dust which settles on the stone is washed off by rainwater rather than being forced into the pores of the stone.

The operator should wear protective clothing so as to prevent accidental damage due to splashes.

Where the method is operated in the region of glass windows, these should first be covered with polyethylene sheets or wet thoroughly so as to prevent damage to the glass.

My composition may be produced by a variety of methods which will be obvious to anyone skilled in the art.

What I claim as my invention is:

1. A method of cleaning a stone surface which comprises applying to the surface a first composition consisting of 15 to 26% by weight of an alkali metal hydroxide, 3 to 8% by weight of a lignosulfonate and 0.1 to 3% by weight of a non-ionic wetting agent and the balance by weight of water, leaving said first composition in contact with said surface for an extended period of time sufficient for said first composition to penetrate said surface, washing said first composition from said surface with water delivered at a minimum nozzle pressure of 300 pounds per square inch, applying an acid-containing composition to said surface, leaving said acid-containing composition in contact with the surface for a short period of time and washing said acid-containing composition from said surface with water delivered at a nozzle pressure of at least 300 pounds per square inch.

2. The method of claim 1 wherein said first composition consists of 21.5% by weight of sodium hydroxide, 5.0% by weight of calcium lignosulfonate, 0.5% by weight of a non-ionic wetting agent and the balance by weight of water.

3. The method of claim 2 wherein said non-ionic wetting agent is an ethylene oxide-nonylphenol condensation product.

4. The method of claim 1 wherein said acid-containing composition consists of 34.8% by weight of 100% concentrated hydrochloric acid, 3.0% by weight of a non-ionic wetting agent and the balance by weight of water.

5. The method of claim 4 wherein said non-ionic wetting agent is an ethylene oxide-nonylphenol condensation product.

6. The method of claim 1 wherein said first composition is applied to said surface by spraying at a nozzle pressure of 20 to 30 pounds per square inch.

7. The method of claim 1 wherein said first composition is left in contact with said surface for 20 to 30 minutes.

8. The method of claim 1 wherein said acid-containing composition is applied to said surface by spraying at a nozzle pressure of 20 to 30 pounds per square inch.

9. The method of claim 1 wherein said acid-containing composition is left in contact with said surface for 10 to 20 seconds.

10. The method of claim 1 wherein said alkali metal hydroxide is sodium hydroxide, said lignosulfonate is calcium lignosulfonate and said non-ionic wetting agent is an ethylene oxide-nonylphenol condensation agent.

11. The method of claim 1 wherein said first composition consists of 21.5% by weight of sodium hydroxide, 5.0% by weight of calcium lignosulfonate, 0.5% by weight of an ethylene oxide-nonylphenol condensation product and the balance by weight of water, said first composition is applied to said surface by spraying at a nozzle pressure of 20 to 30 pounds per square inch, said first composition is left in contact with said surface for 20 to 30 minutes, said acid-containing composition consists of 34.8% by weight of 100% concentrated hydrochloric acid, 3.0% by weight of an ethylene oxide-nonylphenol condensation product and the balance by weight of water, said acid-containing composition is applied to said surface by spraying at a nozzle pressure of 20 to 30 pounds per square inch and said acid-containing composition is left in contact with said surface for 10 to 20 seconds.

References Cited

UNITED STATES PATENTS

| 2,741,051 | 4/1956 | Reissig | 252—156 XR |
|---|---|---|---|
| 2,826,552 | 3/1958 | Bonewitz | 252—156 |
| 2,971,918 | 2/1961 | Goldsmith | 252—156 XR |
| 2,987,426 | 6/1961 | Shaw | 134—29 XR |
| 2,992,187 | 7/1961 | Gershon | 134—29 XR |
| 3,281,341 | 10/1966 | Kharouf | 134—29 XR |

FOREIGN PATENTS 469,333   7/1937   Great Britain.

OTHER REFERENCES

Schwartz, A. M., et al.: "Surface Active Agents and Detergents," vol. II, 1958, pp. 100, 101.

MORRIS O. WOLK, Primary Examiner

D. G. MILLMAN, Assistant Examiner

U.S. Cl. X.R.

134—2, 3, 42; 252—156